United States Patent [19]

Harkiewicz et al.

[11] Patent Number: 4,710,703

[45] Date of Patent: Dec. 1, 1987

[54] DIRECTION SENSING SYSTEM FOR AN AC POWER SUPPLY AND AC MOTOR DRIVE WITH SUCH DIRECTION SENSING SYSTEM

[75] Inventors: Gary A. Harkiewicz, West Seneca; Paul W. Wagener, Alden Township, Erie County, both of N.Y.

[73] Assignee: Westinghouse Electric Corp., Pittsburgh, Pa.

[21] Appl. No.: 819,083

[22] Filed: Jan. 15, 1986

[51] Int. Cl.$^4$ ............................................. G01R 25/00
[52] U.S. Cl. ................................... 324/86; 324/83 R
[58] Field of Search ............... 324/83 R, 83 D, 83 A, 324/107, 86; 307/127; 328/137; 340/658; 361/76, 77, 85; 318/621

[56] References Cited

U.S. PATENT DOCUMENTS

| | | | |
|---|---|---|---|
| 4,206,414 | 6/1980 | Chapman | 324/83 A |
| 4,278,937 | 7/1981 | Immler | 324/86 |
| 4,636,720 | 1/1987 | Farr | 324/86 |
| 4,641,088 | 2/1987 | Jacobsson | 324/83 R |

Primary Examiner—Michael J. Tokar
Attorney, Agent, or Firm—C. M. Lorin

[57] ABSTRACT

The direction of rotation of a three-phase voltage is determined by simultaneous reading of counters triggered by the respective phase zero crossings. Such determination is used in an AC motor drive to dispense of using a tachometer.

4 Claims, 6 Drawing Figures

DIRECTION SENSING SYSTEM FOR AN AC POWER SUPPLY AND AC MOTOR DRIVE WITH SUCH DIRECTION SENSING SYSTEM

BACKGROUND OF THE INVENTION

The present invention relates to apparatus and method for the detection of the vectorial direction of rotation of a multiphase AC voltage power supply. It is more particularly applicable to sensing the direction of rotation of an AC motor in a motor drive.

Rather than sensing the direction of rotation of the motor, it is known in a motor drive to rely upon the rotation of the three-phase voltage at the input of the AC motor. This has been done in the past with counters providing an indication of the magnitude of the voltages in the respective phases as a function of the electrical angle, and the counts so derived were used to effect calculations providing a reference for comparison with the running phase counts and determine phase rotation. In contrast with previous practice, it is now proposed to effect simultaneous readings with counters associated with the current phase voltages and derive directly from such counts, and instantaneously, information relative to the sequence of the phases.

SUMMARY OF THE INVENTION

The invention resides in: concurrently deriving for each phase voltage in relation to the instantaneous electrical angle a count representative of time elapsing from positive zero-crossing; instantaneously comparing the relative magnitudes of all those voltages; and deriving a sign signal characteristic of the order of succession of the phases.

DETAILED DESCRIPTION OF THE INVENTION

Figure 1:
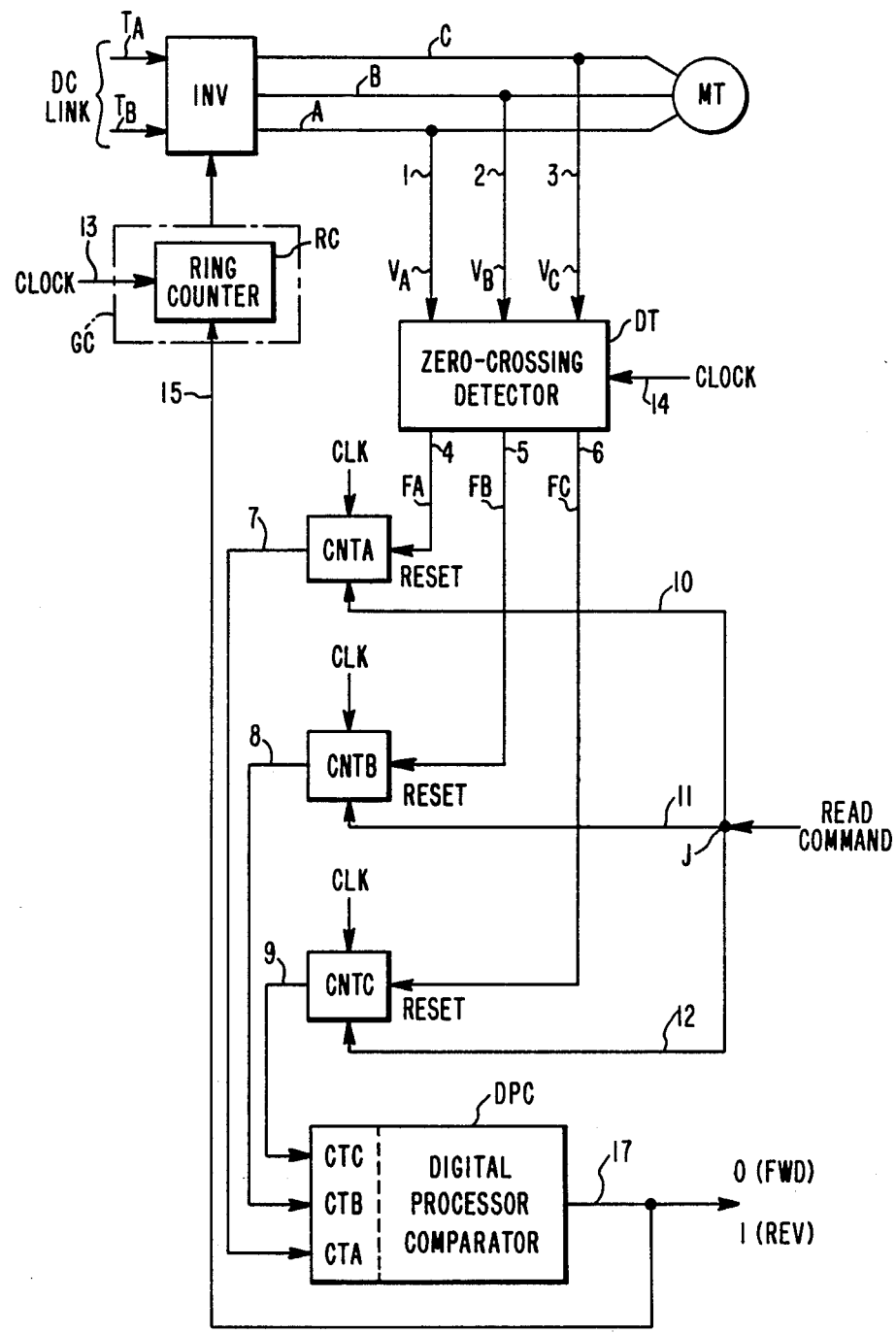
FIG. 1 is a block diagram of the direction sensing system according to the invention, as applied to an AC motor drive.

Referring to FIG. 1, an inverter INV and an AC motor MT are connected, as generally known in an AC motor drive, so that the DC-link between opposite polarity terminals (TA, TB) is converted by the inverter into AC power of respective phases A, B, C, supplied to the motor MT. The inverter is controlled by a gating controller GC as generally known. From phase lines A, B, C, the phase voltages VA, VB, VC are sensed and representative signals vA, vB, vC are derived on lines 1, 2, 3, respectively. A zero-crossing detector DT provides, on lines 4, 5, 6, signals FA, FB, FC which are square-shaped pulses having a front edge timed with one zero-crossing and a tail edge timed with the other zero-crossing. Counters CNTA, CNTB and CNTC responsive to lines 4, 5 and 6, respectively, are reset by the front edge in each corresponding phase. The zero-crossing detector DT and each counter CNTA, CNTB, CNTC are clocked by respective clock signals CLK. Running counts CTA, CTB and CTC are derived on respective lines 7, 8 and 9. A read command, received on line 16, carried by lines 10, 11 and 12, therefrom, simultaneously reads the respective counts existing on CNTA, CNTB, CNTC at a given instant, and such read counts are inputted by lines 7, 8, 9 into a digital processing circuit DPC. According to the present invention, the digital processing circuit, at any instant as commanded by line 16, effectuates comparisons between such derived counts CTA, CTB, CTC which immediately lead to the derivation on line 17 of a digital input which is a 0, or a 1, thereby characterizing the "forward", or the "reverse", direction of rotation. By line 15 the output of line 17 goes to the ring-counter RC, associated with the gating circuit GC, in order to provide the direction of rotation.

Figure 2:
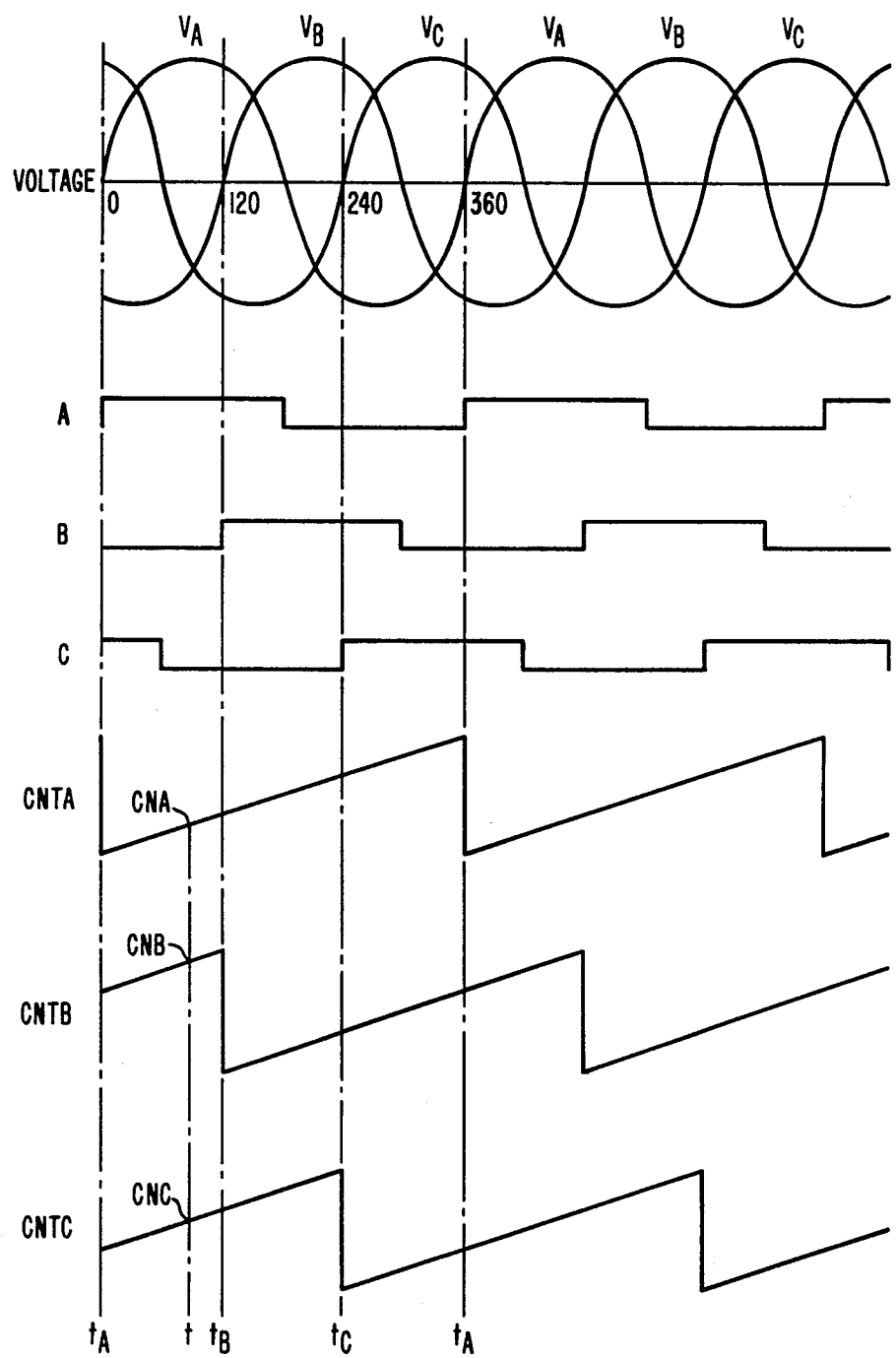
FIG. 2 shows a set of curves illustrating the operation of the system of FIG. 1.

Referring to FIG. 2, curves (a) are the three phase voltages VA, VB, VC; curves (b) are the signals FA, FB, FC of lines 4, 5, 6 respectively; ramps (c), (d) and (e) represent the corresponding counts CTA, CTB, CTC derived by counters CNTA, CNTB, CNTC. At instant tA, counter CNTA is reset to zero. It appears that, until the instant tB when counter CNTB will in turn be reset to zero, count CNB is larger than count CNC.

While FIG. 2 is shown for an order of succession of phases A, B, C, a conclusion can be made from curves (c), (d), (e) for the opposite order, namely C, B, A. In such case, instants tA, tB, tC would follow in the order tC, tB, tA, rather than as shown on FIG. 2. Should, thus, the direction of rotation be the opposite of what is shown in FIG. 2, it will be counter CNTC which will be reset immediately after instant tA, rather than as shown at tB for CNTB. Therefore, a comparison between CNB and CNC would show that CNC now is larger than CNB.

Figure 3:
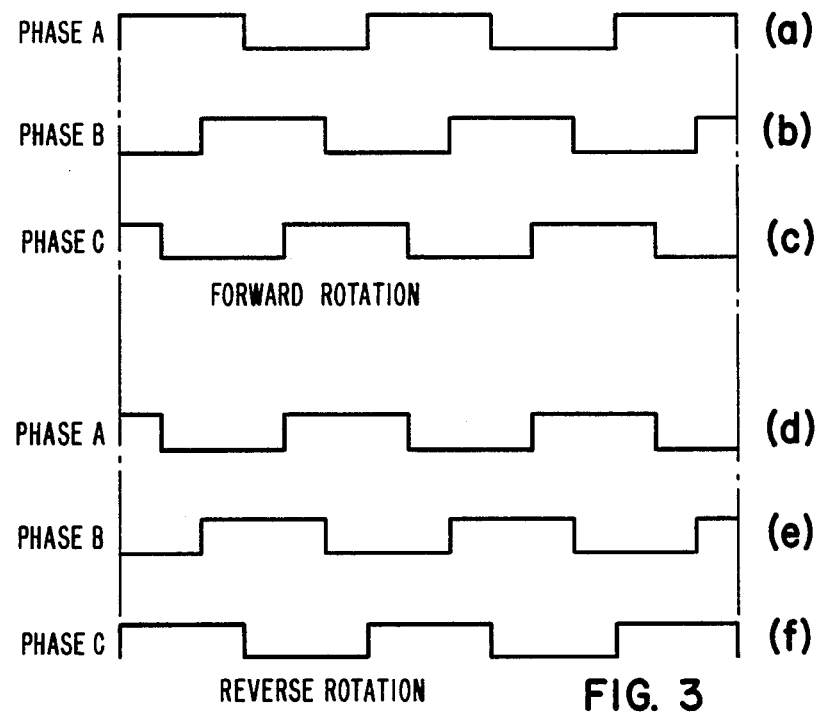
FIG. 3 illustrates with curves the phase relationship of the zero crossing detector for a forward and a reverse direction.

Referring to FIG. 3, the succession of the square wave forms (b) of FIG. 2 is here shown under (a), (b), (c) for the forward rotation (A, B, C) as in FIG. 2, and under (d), (e), (f) for the reverse rotation (C, B, A).

Figure 4:
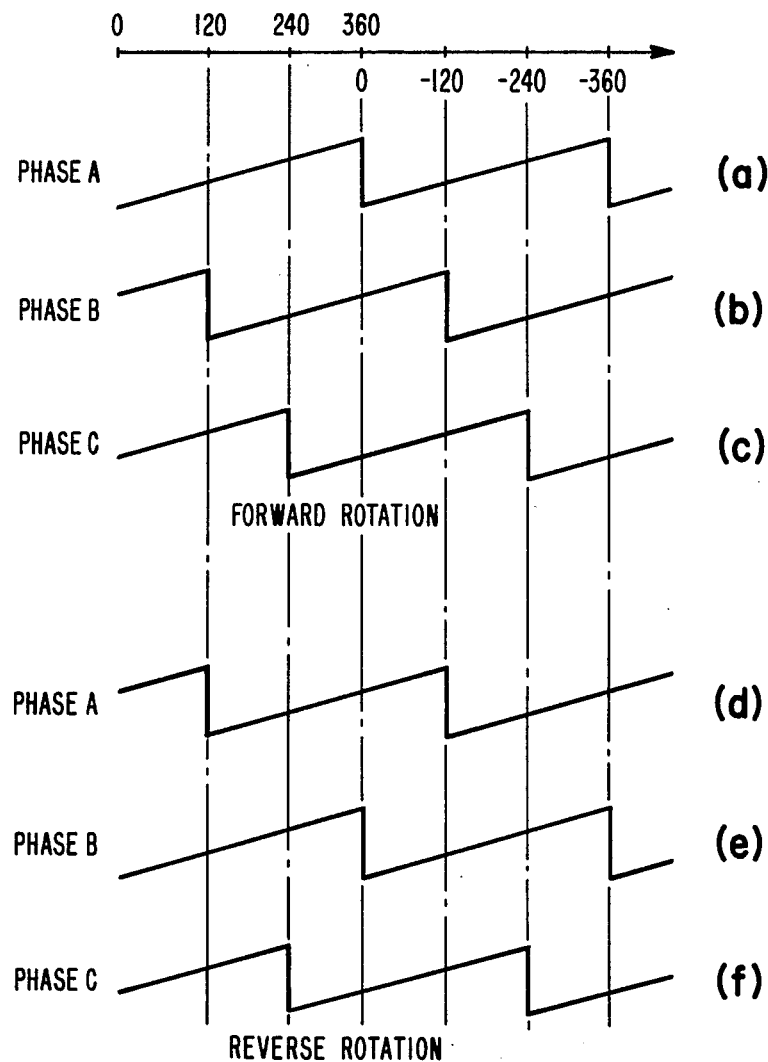
FIG. 4 gives corresponding counting states in magnitude and phase relationship for such two directional modes of operation.

FIG. 4 shows the ramps, previously shown in FIG. 2 under (c), (d), (e) in FIG. 2, successively for the forward direction as (a), (b), (c) and for the reverse rotation as (d), (e), (f).

It appears that the table of truth in the "forward" direction is:

TABLE I

| Electrical Angles | |
|---|---|
| 0–120 | B > C > A |
| 120–240 | C > A > B |
| 240–360 | A > B > C | where:
A = CTA of counter CNTA;
B = CTB of counter CNTB;
C = CTC of counter CNTC.

For the "reverse" rotation the table of truth is:

TABLE II

| Electrical Angles | |
|---|---|
| 0-120 | B > A > C |
| 120-240 | A > C > B |
| 240-360 | C > B > A |

It appears also that by comparing counts CTA, CTB and CTC by pairs, either table of truth (Table I, or Table II) can be recognized, thereby ascertaining the sense of rotation.

Figure 5:
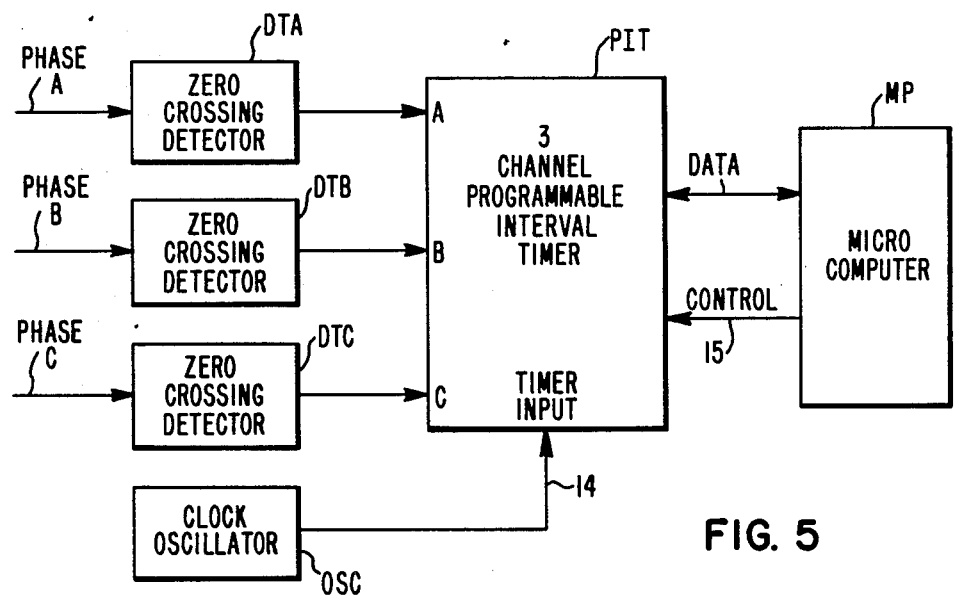
FIG. 5 is a block diagram illustrating hardware to be used for direction sensing in a system like shown in FIG. 1.

Referring to FIG. 5, a digital embodiment of the invention is shown to include three zero-crossing detectors DTA, DTB, DTC responsive to signals $V_A$, $V_B$ and $V_C$ of lines 1, 2, 3 of FIG. 1. The outputs of DTA, DTB, DTC are fed by lines 4, 5, 6 into a three-channel programmable internal timer PIT, thus, like CNTA, CNTB and CNTC of FIG. 1 responsive to signals FA, FB, FC. Circuit PIT includes timers, or counters, CNTA, CNTB, CNTC like in FIG. 1. The timers are reset and they begin counting from zero at each rising edge of the corresponding FA, FB or FC signal at the input. The timers count the pulses CLK received on line 14 from an external clock oscillator OSC. This leads between pins A, B and C either to the sequence of curves (a), (b) and (c) of FIG. 4, for "Forward", or to the sequence of curves (d), (e), (f) of the same FIG. 4, for "Reverse".

Circuit PIT is controlled, via line 15, by a microcomputer MP which handles counts CTA, CTB, CTC derived from the timers within circuit PIT. These data are used by the microcomputer to make comparisons by pairs between the three counts, then, to make a determination as to the direction of rotation.

Figure 6:
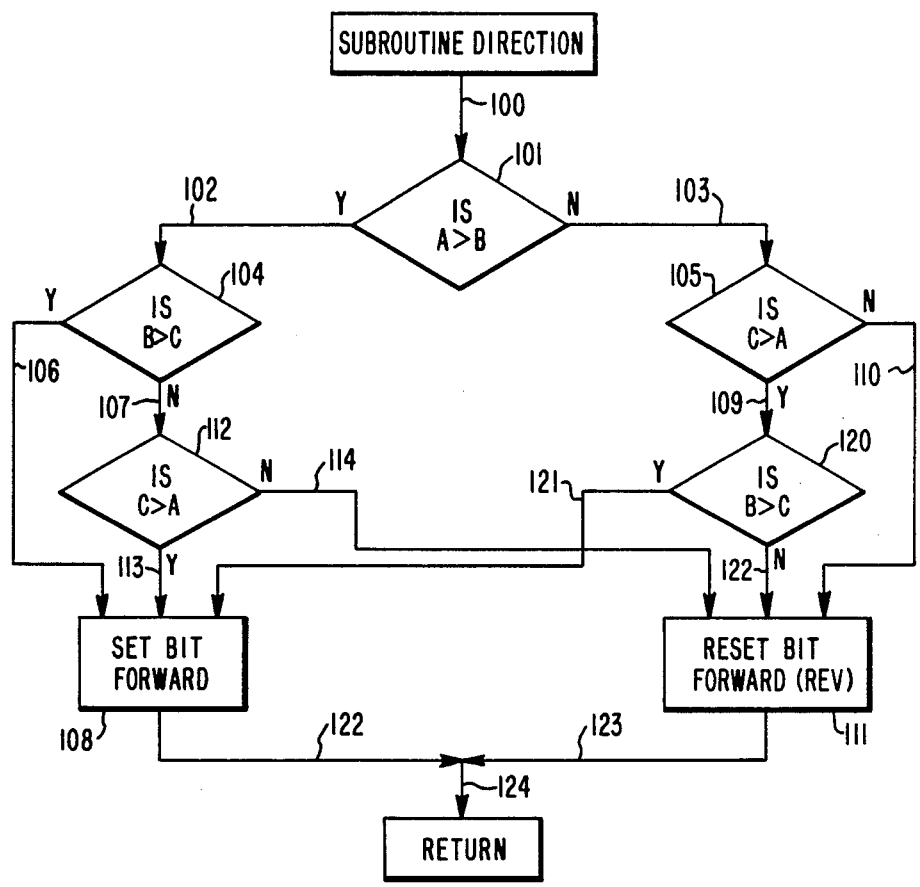
FIG. 6 is a flow chart illustrating final direction determination after various count comparison steps involved under the applicable truth tables.

Referring to FIG. 6, the operation of the microcomputer MP in conjunction with counts CTA, CTB, CTC as instantaneously read, is illustrated by a flow chart. The subroutine is initiated by line 100 and first performed with block 101, where the question is: whether count A is larger than count B. If the answer is YES, by line 102 the system goes to block 104. If the answer at 101 is NO, by line 103 the system goes to block 105. At 104, the question becomes: whether count B>count C. Upon YES at 104 the answer matches Table I for the electrical angles 240°-360°, and the rotation is "Forward". To that effect, following line 106, the 0 bit is set on line 122 by block 108. Upon a NO at 104, the system goes by 107 to block 112 where the question becomes: whether count C>count A. If a YES at 112, the answer, combined with blocks 104 and 101, matches Table I for electrical angles 120°-240°. Again, by line 113, the zero bit for "Forward" is set by block 108. However, if at 112 the answer is NO, by 119 the system goes to 111 where bit ONE is set indicating "Reverse" rotation. This is in accordance with Table II and electrical angles 120-140 degrees.

Upon a NO on line 103, at 105 the question becomes: whether count C>count A. If so, by line 110 block 111 is told to be set as a ONE on line 123 for "Reverse" rotation. This is in accordance with Table II, since both block 101 and block 105 give a NO, indicating that the relationship for electrical angles 0°-120° in Table II is satisfied. Upon a YES at 105, by line 109 the system goes to block 120, where the question becomes: whether count B is larger than count C. A NO means going by line 122 to block 111 for "Reverse" rotation, since C>A and C>B with A<B, indicates in Table II the range 240°-360°. Finally, if at 120 the answer is YES, by line 121 the system goes to block 108, indicating "Forward" rotation, since in Table I for 0°-120°, blocks 101, 105 and 109 so conclude.

Accordingly, on output line 124 is derived either a ZERO bit for "FORWARD" from block 108 by line 122, or a ONE bit for "REVERSE" from block 111 by line 123. This signal is derived instantaneously under operation of the "subroutine direction" commanded by line 100. This one-bit signal of line 12 is used by the microcomputer in its command and interpretation of the system.

We claim:

1. A method of ascertaining the phase rotation of the three AC phase voltages of a three-phase AC power supply; said phase voltages being viewed in a predetermined order; comprising the steps of:
    sensing each of said phase voltages to derive a representative waveform thereof;
    detecting for each of said representative waveforms a zero-crossover;
    counting for each waveform and simultaneously for all phases the amount of electrical degrees accumulated from the corresponding detected zero-crossover to derive a corresponding phase count;
    establishing by pairs for each consecutive phases in a predetermined order of succession corresponding to said predetermined order a reference sign of inequality between the accumulated electrical angles on such pairs of consecutive phases;
    comparing in magnitude said phases counts as derived to derive an actual sign of inequality between phase counts in each pair; and
    deriving a phase rotation representative signal from matching said reference signs of inequality with said actual signs of inequality.

2. Apparatus for deriving an indication of the phase rotation of a three-phase AC power supply, comprising:
    means for sensing the phase voltages of said three-phase AC power supply and for deriving a waveform representative signal for each phase;
    means responsive to said waveform representative signals for detecting the occurrence of zero-crossovers for said phase voltages;
    three timer means each associated with one phase and respectively responsive to said waveform representative signals for counting with each waveform the amount of electrical degrees accumulated thereon, counting being initiated upon the occurrence of one zero-crossover and being reset upon the occurrence of the same zero-crossover in each of said timer means, thereby to derive a corresponding phase count;
    means for deriving upon a command signal a read count simultaneously from each phase count of said timer means;
    means for comparing said read counts in magnitude by pairs to derive a sign of inequality characterizing signal for each pair of read counts;
    means for establishing a first reference set of inequality signs characterizing for the three pairs of phases one direction of phase rotation and a second reference set of inequality signs characterizing for the respective pairs of phases another direction of phase rotation; and
    look-up table means for relating read count inequality characterizing signals to one of said first and second reference sets to derive a signal representing an actual phase rotation direction for said AC power supply.

3. The apparatus of claim 2, with said AC power supply being the output of an inverter and the input of an induction motor in an AC motor drive system.

4. The AC motor drive system of claim 3 with said motor drive being a synchronous motor drive including an open-loop for controlling said inverter, said open-loop being responsive to a speed reference signal; with said feedback speed signal including an absolute value and a sign given by said direction of rotation of said AC power supply as representing one of the Forward and Reverse direction of rotation of said motor, with said sign of said feedback speed signal being derived from said look-up table means derived signal.

* * * * *